April 19, 1960     D. KATZ     2,933,337
ANTI-SKID IMPLEMENT FOR AUTOMOBILES
Filed Sept. 19, 1956     3 Sheets-Sheet 1

INVENTOR
David Katz.

April 19, 1960          D. KATZ          2,933,337
ANTI-SKID IMPLEMENT FOR AUTOMOBILES
Filed Sept. 19, 1956          3 Sheets-Sheet 2
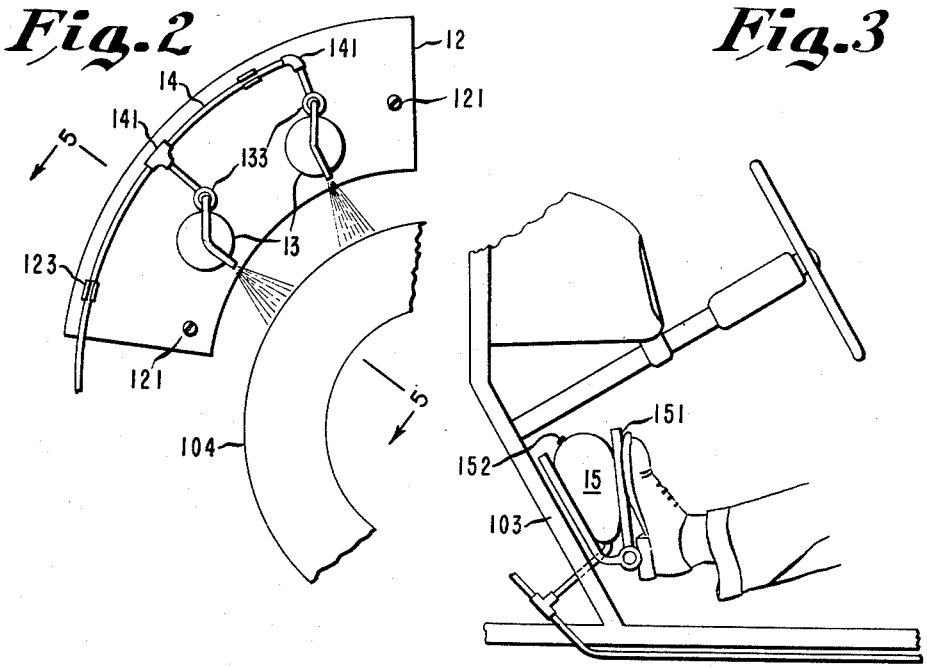
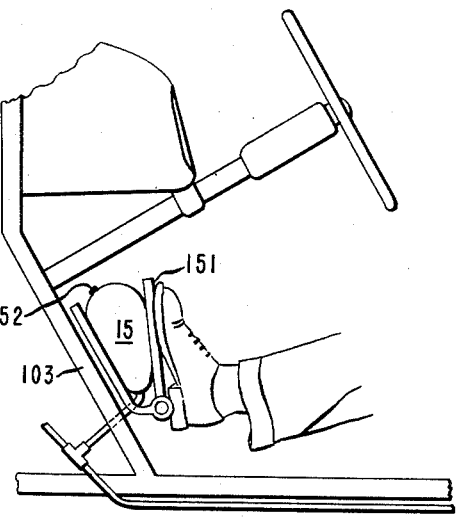
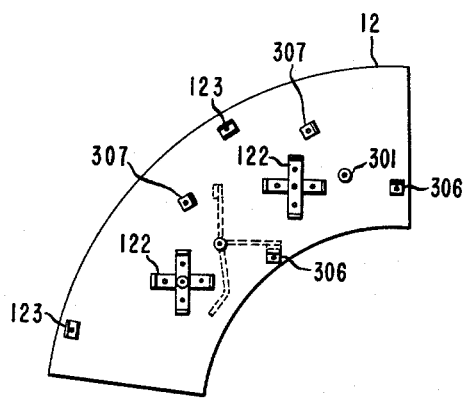
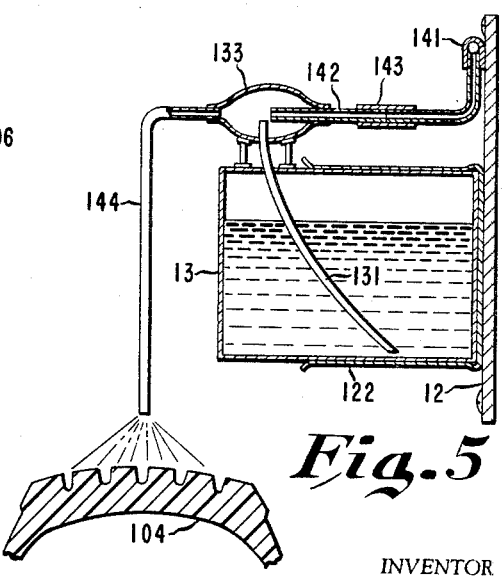
INVENTOR
David Katz.

April 19, 1960  D. KATZ  2,933,337
ANTI-SKID IMPLEMENT FOR AUTOMOBILES
Filed Sept. 19, 1956  3 Sheets-Sheet 3

INVENTOR
David Katz.

United States Patent Office 2,933,337
Patented Apr. 19, 1960

2,933,337

ANTI-SKID IMPLEMENT FOR AUTOMOBILES

David Katz, Wilmington, Del.

Application September 19, 1956, Serial No. 610,764

6 Claims. (Cl. 291—1)

This invention relates to self-propelled land vehicles which ride on rubber tires. It is an object of this invention to provide vehicles of this type with means whereby to improve their performance and dependability in the winter season, particularly with reference to travelling on icy pavements or fresh snow. Other objects and achievements of this invention will become clear as the description proceeds.

We shall use hereinafter the automobile as typical of the class of self-propelled vehicles riding on rubber tires. It will be understood, however, that the invention is not limited thereto, inasmuch as its principal features and action are applicable also to trucks, motorcycles, airplanes during the moments when they taxi on the ground, and any other similar type of vehicle which would be handicapped by skidding or spinning of the wheels on ice-coated pavements.

The practical difficulties of skidding on ice or spinning of the wheels in a snow bank are familar to anyone who has ever attempted to drive a car in regions where snow and ice are seasonal phenomena. All attempts to solve the problem hitherto seem to have rested on a mechanical approach to the same. Realizing that the source of the difficulty is the highly reduced friction between the rubber tire and the slick icy or snow-covered pavement, all remedies hitherto tended toward the idea of wrapping ropes or chains around the tires. This type of solution, however, is highly unsatisfactory for numerous reasons.

In the first place, the job itself of putting on the chains is an arduous physical task and is ill adapted for performance in clean business clothes. The job becomes particularly noxious when, through repeated snowfall and melting, the chains have to be put on and taken off several times in one week. On the other hand, leaving the chains on after the snow has disappeared or while driving on clean dry pavement renders the ride noisy, uneven and slow, and may even result in injury to the tires.

Now, according to this invention, I propose to solve the problem by chemical means. More particularly, this invention provides a means for depositing at will, and without much effort, a film of sticky material on the tread of the tires, whereby to achieve instantaneously two effects:

(1) Friction between the tire and the pavement increases, regardless whether the latter is covered with ice, water or fresh snow.

(2) If lodged in a soft snow bank, the tires upon spinning pick up tufts of snow, which help further in extricating the car from the snow bank.

In general terms, my invention provides the automobile with a panel in front of each rear tire (or optionally also in front of each front tire) carrying containers adapted to discharge at least two different chemical fluids, which react on the surface of the tire to produce locally a sticky deposit. My invention further comprises means, such as a squeeze-bulb or pump, located near the steering wheel within easy reach of the hand or foot of the driver, by which he can at will cause said containers to discharge said chemical fluids in the form of a spray upon the tread of the respective tire. As an optional feature, my invention comprises further means whereby the spray nozzles or discharge ends from said fluid containers may be shielded against dirt-particles in travel and during the long intervals between use.

For a clearer understanding of my invention, reference is now made to the accompanying drawings, wherein Figure 1 is a vertical view, partly in section, of an automobile containing my novel installation.

Figure 2 is an enlarged view of the panel and its instrumentalities situated in front of the rear tire. This view is a vertical section through the rear left fender when the observer is facing the automobile broadside.

Figure 3 is a detail of a modified form of the installation near the steering column, still having the form of a syringe bulb, but adapted to be actuated by the driver's left foot.

Figure 4 is a detail of the panel which is to be installed in front of each rear tire (or in front of each front and rear tire, if desired). This view shows the panel with its essential prongs or brackets for holding the fluid containers and other instrumentalities, but without the latter, for clearness.

Figure 5 is an enlarged section of Figure 2, along the line 5—5, and shows one of the fluid containers with its atomizer pipette and adjacent air stream pipette.

Figure 1:
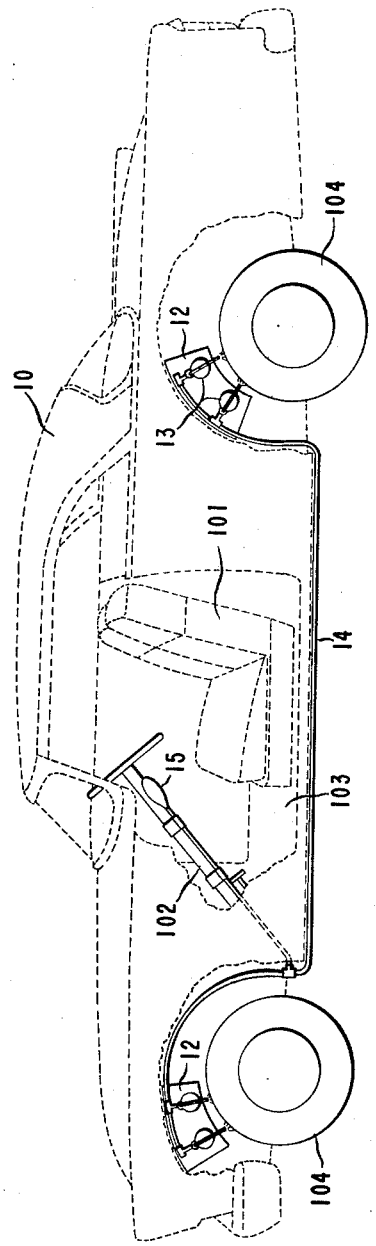

Taking up now these figures in detail we have in Figure 1, a general outline of an automobile body 10, containing a driver's seat 101, a steering-wheel and steering column assembly 102, floor boards 103, and front and rear wheels 104.

At a suitable location near each wheel, preferably in front of each wheel and inwardly from the plane of the wheel, a panel 12 is secured by optional means for instance rivets 121, to a convenient portion of the body of the vehicle, for instance the frame or the roof-like sheet-metal forms which surround the upper portion of each wheel. The shape of this panel and its exact location and mode of attachment are immaterial, its principal object being merely to serve as a fixed support for elastic brackets or prongs 122 (Figures 4 and 5) which are adapted to receive and hold tightly but removably dispensers 13.

Panel 12 may possess also prongs 123 for detachably securing to the panel the thick-walled, rubber piping 14 or its hard-rubber distributor heads, direction blocks or joints 141.

The flasks or containers 13 are preferably made of glass or plastic and contain solutions of mutually reactive chemicals as more fully explained below. If metal is used in the structure of the flask, it should be lacquered or glazed to avoid corrosion or catalytic effects upon the chemicals.

Each flask is generally sealed, except for an atomizer pipette 131, which passes through its top and reaches down to the bottom of the flask. Pipette 131 ends outside the flask inside a drum 133, and is disposed in close, atomizer relation to the orifice of an air pipette 142, which is connected through distributor head 141, to the principal air duct 14. Pipette 142 may be made of glass, plastic or aluminum, and is preferably made in 2 parts joined together by a short strip of rubber piping 143, to provide for easy replacement of the dispenser combination 13 and 133, when the liquid in the former has been consumed.

A nozzle 144 is further provided to pick up the atomized spray formed by the cooperation of the two orifices and to discharge it upon the tread of the tire, preferably near the vertical plane of symmetry of the tire body (Figure 5).

The principal air duct 14, made of thick walled fine bored rubber tubing or of metal runs along the bottom of the car body toward the steering column and is eventually brought up, through suitable openings in the sheet-metal panels, and connected with a pump, squeeze bulb or similar device 15, which is located within easy reach of the driver's hand or foot. The driver is thus enabled to actuate at will the atomizer and to cause a spray of the solution from each flask to be directed coincidentally upon the tread of tire 104.

The pumping device 15 is shown in the form of a squeeze bulb in Figures 1 and 3. In Figure 1 it is bracketed onto steering column 102, within easy reach of the driver's left hand. In Figure 3, it rests against the sloping portion of the floor 103, and is covered by pedal 151 within easy reach of the driver's left foot. In either event, it is designed to send a rush of air through pipe 14 upon being compressed, and to refill itself with air upon being relaxed. For this purpose, any well known valve device 152 may be employed, not excluding a simple hole and overhanging flap device as in the old fashioned blacksmith's bellows.

In lieu of a squeeze bulb, as indicated, any other equivalent device may be employed, for instance, a cylinder and piston device, a hand pump, or a circular pump operated by a small motor on battery current upon pushing a button.

Figure 8:
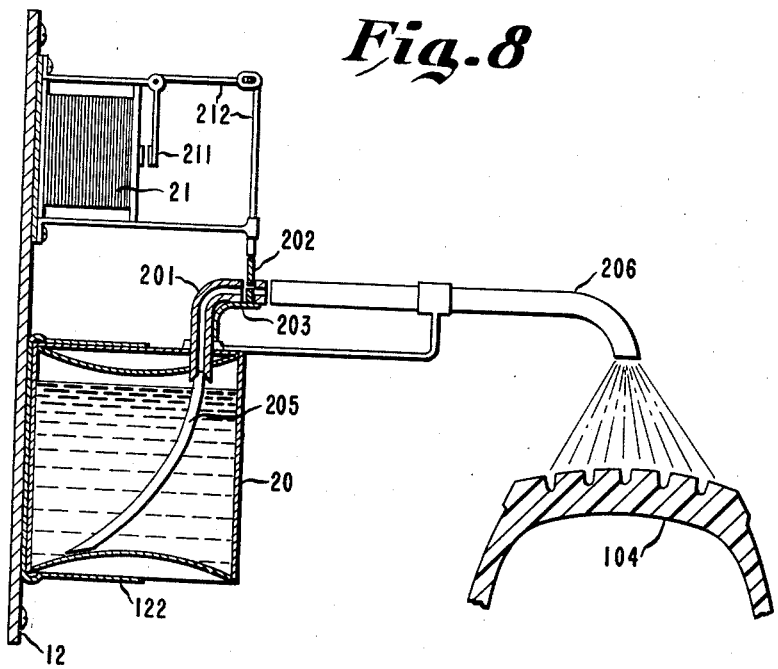
Figure 8 is a sectional view like Figure 5, but showing a modified form of this invention, which employs a pressurized fluid container and an electromagnet for actuating the same.

Furthermore, the squeeze bulb itself may be located on panel 12, thereby avoiding running air-tubing all the way from this panel to the steering column. In such event, the compression may be achieved by a pivoted lever device which is operated by means of an electromagnet so as to squeeze the bulb whenever and as long as the driver holds his finger on a push button located within his reach along the steering column. Electrical wiring then runs along the body of the car to include in one circuit the electromagnet, the car battery, and the push button. The structure in this case is not much different from that discussed hereinbelow in connection with Figure 8.

Finally, there is no absolute need for using a squeeze bulb at all. Instead, the containers holding the chemical solutions may be constructed on the principle of the Aerosol bomb or whipped cream dispenser which contains a liquified propellent (such as "Freon" or nitrous oxide) and releases its contents in the form of a spray whenever its cap is pressed to expose an orifice to the atmosphere. In such an event, there is no need for air ducts between each panel and the steering column. Instead, electric wiring will be provided to include in one circuit a push button within easy reach of the driver, the car battery, and an electromagnet situated on panel 12 and adapted to manipulate the caps of dispensers to open and shut off the spray. As an illustration of such a structure we may turn to Figure 8, wherein the brackets 122, affixed to panel 12, hold a pressurized fluid container 20. The latter is provided with a pressure valve 201, including movable plug 202 which is normally held in the shut-off position by a spring such as 203. Panel 12, however, carries also an electromagnet 21, which when energized operates through the armature 211 and linkage mechanism 212 to push-in plug 202 until its orifice is aligned with duct 205, thereby putting the system into the open position. The fluid discharge, duly atomized by the escape of the propellent gas, is guided by duct 206 for discharge upon the tread of tire 104.

Of course, mechanical means such as linkage mechanisms or push-wires may be substituted for the electromagnets and their wiring, to actuate the caps of the dispensers from the driver's seat.

Returning now to containers 13 or 20 they are filled with solutions of two different chemicals which upon contact react to produce a sticky or gummy substance. Numerous chemical solutions to this aspect of the problem may be devised. For instance, one of the dispensers may contain an aqueous solution of a phosphate glass (Encyclopedia of Chemical Technology, Kirk-Othmer, vol. 10, pages 418–424), while the other flask contains a solution of a water-soluble quaternary ammonium compound such as trimethyl-benzyl ammonium chloride, dimethyl-benzyl-phenyl ammonium chloride, etc., or the corresponding hydroxides. It is the nature of these two types of reagents that they form upon contact very sticky products, which adhere tenaciously practically to any surface.

The solutions in the flasks are preferably sufficiently concentrated to keep the solutions from freezing in the coldest weather encountered in the location of their intended use. This high concentration, furthermore, together with the atomized physical form of the encountering liquids insures almost instantaneous reaction.

The pipettes 144 of the two dispensers may be so directed that the two sprays fall upon the same spot on the tire, simultaneously or in quick succession. This matter is inconsequential, because rotation of the tire, due to spinning in the snow bank or due to actual motion on the road will soon bring any spot which has been impregnated by the rearmost solution under the spray of the one in front. The important thing is that the several reacting fluids sooner or later wet coinciding sites on the surface of the tire and are thus brought into contact with each other for chemical interaction. Of course, the driver will soon learn to maintain the spray for a reasonable interval, corresponding to at least one full rotation of the tire. Learning of precision, however, in this respect is not required, inasmuch as the driver will naturally re-apply the spray when he observes that his previous efforts have not been entirely successful.

Except in the case of a motor-driven pump, operation of the syringe or the electric push-button by the driver will naturally be halted as soon as the car is out of the snow bank or as soon as the driver feels that it runs satisfactorily on the icy pavement. Should the adhesive precipitate on the tire wear off after travelling some distance, the driver will simply press again the syringe. On the other hand, if he comes out of a slippery by-road onto a well travelled, clean and dry highway, he will allow the adhesive to wear off and continue his travel as "without chains."

Figure 6:
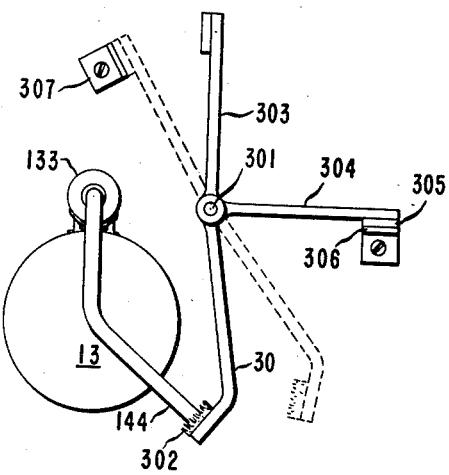
Figure 6 is a vertical vitw of an optional device, for holding a soft brush or a felt or velvet pad against the orifice of the spray device, whereby the keep the same clean through the periods of non-use.

To keep the device in constant readiness for operation, it is desirable to keep the atomizing orifices protected against dust and dirt from the road. A simple device for this purpose is suggested in Figure 6.

A lever 30 is suspended in a vertical plane on pivot 301 which is affixed to panel 12. The lower end of the lever carries a tooth-brush like assembly of soft bristles 302, or a soft felt pad or similar device, adapted to rest against the orifice of the atomizing pipettes 144 so as to protect it against dust. An arm 304 of the lever carries at its end a soft-iron armature-piece 305, which is normally held fast to permanent magnet 306, the latter being affixed to panel 12. In this position, the felt pad or bristle head 302 rests tightly against the orifice of the atomizer nozzle.

A third lever arm 303 extends in a nearly vertical direction about the pivot, and normally does not influence the play of forces between the magnet-end and the orifice-end of the lever. But when a sudden blast of air displaces the felt-pad end slightly, the weight of lever 303 trips the system against a stop 307, and causes the pad device to swing out of the region of spray. When the spray has ceased and the car starts moving, inertia throws lever arm 303 back for an instant, causing armature 305 to come within the zone of strong influence of the magnet, thereby again covering up the orifice.

Figure 7:
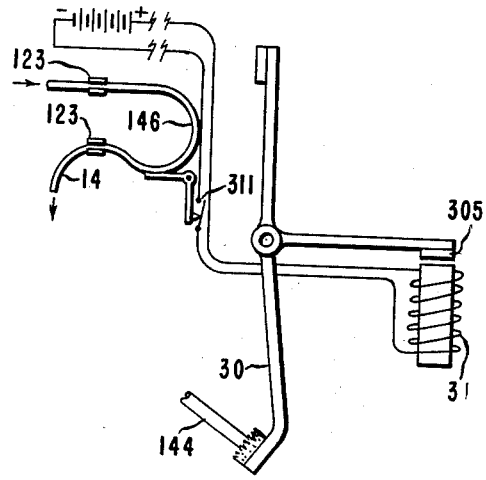
Figure 7 is a vertical view of a modified form of the device shown in Figure 6.

If desired, the permanent magnet 306 may be replaced by an electromagnet fed from the battery. In that event, the wiring from electromagnet coil 31 is preferably run through a key 311 (Figure 7) so arranged that the circuit is broken when a blast of air is started through pipe 14. This may be achieved by having the key opened through the sudden movement of bristle-head 302 itself or by arranging to have the key opened through the centrifugal action of the air current upon any curved portion (or deliberately provided loop 146) in the rubber pipe 14. In either case, the key becomes closed again as soon as the blast is discontinued, and the resulting electrical current through the electromagnet holds the magnet pieces together as long as the syringe device is not pressed.

It will be clear from the above discussion that according to my invention, a film of adhesive substance is formed upon the surface of the tire tread instantaneously, as needed, and by the reaction locally of two chemical solutions which in themselves have no sticky qualities. This is an advantages over such proposals, for instance, as to spray a suspension of a sticky substance upon the tire, for in the latter event, the suspension is apt to coagulate along the narrow pipettes and clog the latter, preventing satisfactory operation at the instant of need. In my invention, each chemical solution is free of gummy material, and there is nothing to clog the pipettes, except perhaps evaporation, which however is kept down to a negligible rate by virtue of the special device hereinabove described for keeping the orifices covered up during periods of non-use.

It is contemplated that in practice the dispensers or cans 13 containing the requisite chemicals will be handled in commerce as standardized units, fitting the prongs 122 of standard panel 12, and having secured to themselves the requisite pipettes of the atomizer assembly 144—133—142, so that when any such dispenser becomes empty, it will constitute a simple task to replace the same by another unit of the same structure, size and content.

Other, secondary details of construction and variation will be readily apparent to those skilled in the art.

For balancing the traction, it is recommended that my anti-skid implement be installed in pairs; that is, either at the two rear tires or at all four tires. However, to some degree, improved traction may be obtained even if only one tire is provided with my device, for instance the left rear tire. Furthermore, in the case of a motorcycle there is only one rear tire to equip.

I claim as my invention:

1. In combination with a self-propelled vehicle travelling on rubber-tired wheels, panels secured to stationary parts of the vehicle body, in proximity to at least two of said tires, means on each panel for securing thereto a plurality of containers for different and mutually reactive chemical fluids, atomizing means associated with each container and adapted to direct a spray of the chemical fluid within the container upon the tread of the adjacent tire, and means located within operative reach of the driver of the vehicle for actuating said atomizing means whereby to cause sprays of the respective fluids out of the several containers on each panel to fall upon coinciding sites on the tread of the respectively adjacent tire, whereby each of said tires may be wetted coincidentally with said mutually reactive chemical fluids from said containers at the will of the driver.

2. The method of increasing traction between a rubber tire of a self-propelled vehicle and an icy pavement, which comprises spraying the tread of said tire in coinciding spots with a plurality of different chemical solutions which are mutually reactive to form an adhesive, gummy film upon said tread.

3. The method of increasing traction between a rubber tire of a self-propelled vehicle and an icy pavement, which comprises spraying the tread of said tire coincidentally with a plurality of aqueous solutions of chemical reagents which are reactive toward each other to form an adhesive reaction product, one of said reagents being a glassy phosphate.

4. The method of increasing traction between a rubber tire of a self-propelled vehicle and an icy pavement, which comprises spraying the tread of said tire coincidentally with a plurality of aqueous solutions of chemical reagents which are reactive toward each other to form an adhesive reaction product, one of said reagents being a quaternary ammonium compound.

5. The method of increasing traction between a rubber tire of a self-propelled vehicle and an icy pavement, which comprises spraying the tread of said tire coincidentally with an aqueous solution of a glassy phosphate and an aqueous solution of a quaternary ammonium compound, whereby to produce a sticky reaction product in contact with the tread of said tire.

6. In combination with a self-propelled vehicle travelling on rubber tired wheels, panels secured to stationary parts of the vehicle body in proximity to each of its rear tires, a plurality of pressurized containers secured to each panel and containing separately, mutually reactive chemical fluids, each of said containers containing further a propellent fluid and being provided with a valve for releasing its fluids in the form of a spray; means secured to said vehicle and operable from the driver's seat for actuating the valves of said containers, to the effect that portions of said different chemical fluids on each panel are sprayed coincidentally upon the tread of the respectively adjacent tire to form by mutual reaction a sticky deposit upon said tread.

References Cited in the file of this patent

UNITED STATES PATENTS

| | | |
|---|---|---|
| 1,734,277 | Skolnik et al. | Nov. 5, 1929 |
| 1,755,823 | Hopkins | Apr. 22, 1930 |
| 1,818,815 | Rothstein | Aug. 11, 1931 |
| 1,824,815 | Fuchs | Sept. 29, 1931 |
| 2,110,247 | Swan | Mar. 8, 1938 |
| 2,677,626 | Bodle et al. | May 4, 1954 |
| 2,788,337 | Preiswerk et al. | Apr. 9, 1957 |